(12) United States Patent
Liebelt et al.

(10) Patent No.: US 9,501,254 B2
(45) Date of Patent: Nov. 22, 2016

(54) WORKFLOW ACTIVITIES FOR SUPPRESSION OF DOCUMENTS INSIDE OF A PRINT JOB

(71) Applicants: Linda Sue Liebelt, Boulder, CO (US); Michael Glen Lotz, Longmont, CO (US); Kyle P. Manning, Fruit Heights, UT (US); Marquis G. Waller, Beverly, OH (US)

(72) Inventors: Linda Sue Liebelt, Boulder, CO (US); Michael Glen Lotz, Longmont, CO (US); Kyle P. Manning, Fruit Heights, UT (US); Marquis G. Waller, Beverly, OH (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/675,481

(22) Filed: Mar. 31, 2015

(65) Prior Publication Data
US 2016/0291909 A1 Oct. 6, 2016

(51) Int. Cl.
*G06F 3/12* (2006.01)

(52) U.S. Cl.
CPC ............ *G06F 3/1263* (2013.01); *G06F 3/1211* (2013.01); *G06F 3/1264* (2013.01); *G06F 3/1265* (2013.01)

(58) Field of Classification Search
CPC .................................................... G06F 3/1263
USPC .............................................. 358/1.13, 1.15
See application file for complete search history.

(56) References Cited

U.S. PATENT DOCUMENTS

| | | | |
|---|---|---|---|
| 7,359,083 B2 | 4/2008 | Salgado | |
| 8,234,237 B2 | 7/2012 | Jones | |
| 8,786,877 B2 | 7/2014 | Dennison et al. | |
| 2002/0129081 A1* | 9/2002 | Rai | G06Q 10/10 718/102 |
| 2007/0182985 A1* | 8/2007 | Ciriza | G06F 21/608 358/1.15 |
| 2008/0144084 A1* | 6/2008 | Rai | G06F 3/1204 358/1.15 |
| 2009/0073500 A1* | 3/2009 | Brown | G06F 3/1294 358/402 |
| 2009/0244600 A1 | 10/2009 | Haycock et al. | |
| 2011/0194135 A1 | 8/2011 | Hamilton et al. | |
| 2011/0231008 A1 | 9/2011 | McIntee | |
| 2012/0194849 A1 | 8/2012 | Lahey et al. | |
| 2013/0155436 A1 | 6/2013 | Gaertner et al. | |
| 2014/0160521 A1 | 6/2014 | Jahn | |

OTHER PUBLICATIONS

European Search Report, EP16162865, Aug. 1, 2016.

* cited by examiner

*Primary Examiner* — Jacky X Zheng
(74) *Attorney, Agent, or Firm* — Duft Bornsen & Fettig LLP

(57) ABSTRACT

Systems and methods are provided for utilizing a workflow activity to suppress individual documents of a print job prior to printing. One embodiment is a workflow server that includes an interface and controller. The interface receives a print job that defines documents which each indicate an intended recipient for delivery. The controller directs devices of a print shop by following a print workflow that comprises an ordered set of activities to perform upon the documents. The controller also detects that the print job has reached a scheduled activity of the workflow for pulling documents from the print job based on criteria, identifies documents of the print job that match the criteria indicated by the activity, and removes the identified documents from the print data for the print job before the print job is printed, preventing printing of the identified documents.

20 Claims, 6 Drawing Sheets

DATA EXTRACTED FROM PRINT JOB

| ACCOUNT | ZIP | TELEPHONE |
|---|---|---|
| 000001 | 90391 | 555-3044 |
| 000002 | 84812 | 555-6723 |
| 000003 | 57573 | 555-4821 |
| 000004 | 80807 | 555-0912 |
| 000005 | 12321 | 555-1111 |
| 000006 | 13234 | 555-4231 |
| 000007 | 54277 | 555-9178 |

410

SUPPRESSION FILE 2

| ACCOUNT |
|---|
| 000001 |
| 000002 |
| 000003 |
| 000004 |
| 000005 |
| 000006 |
| 000007 |

430

SUPPRESSION FILE 1

| ZIP |
|---|
| 90391 |
| 84812 |
| 57573 |
| 80807 |
| 12321 |
| 13234 |
| 54277 |

420

WORKFLOW ACTIVITIES FOR SUPPRESSION OF DOCUMENTS INSIDE OF A PRINT JOB

FIELD OF THE INVENTION

The invention relates to the field of print job management, and in particular, to workflow systems for a print shop.

BACKGROUND

Print shops are typically medium or large scale facilities capable of supplying printing services to meet a variety of customer demands. For example, print shops are often used to print documents for mass-mailing (e.g., bills, advertisements, etc.). Because print shops engage in printing on a scale that is hard to match, their customer base is usually varied. Print shop customers may therefore include both large institutional customers (e.g., credit card companies and banks), and small customers (e.g., small businesses and churches).

Print shops are generally arranged to print incoming jobs from customers in a way that is economical, yet fast. Thus, print shops often include a number of high-volume printers capable of printing incoming jobs quickly and at high quality. Print shops also typically include post-printing devices that process the printed documents of each job (e.g., stackers, staplers, cutters, binders, etc.). Print shops may also provide digital/web publishing, e-mail, or other multimedia services to customers. Because print shops serve a variety of customers, they are often tasked with processing jobs that have varying printing formats, delivery dates, and media requirements. Print shops therefore may use a centralized server that coordinates activity between printers and other devices of the print shop. However, print shop operators continue to desire enhanced servers capable of managing print jobs that have complex requirements.

SUMMARY

Embodiments described herein process a multi-document print job based on a workflow that defines an ordered set of print shop activities to perform. The workflow includes one or more activities that explicitly direct a workflow server to pull certain documents from inside of a print job in order to suppress the documents from printing and/or delivery. This allows a print shop to use a workflow to dynamically prevent documents from printing and/or delivery, even though the print job is already being processed and prepared for printing. For print jobs that include hundreds of thousands of documents and take days to print, the ability to dynamically pull documents from a print job that is already being processed (e.g., from anywhere in the workflow) provides a level of responsiveness that was not previously available.

One embodiment is a workflow server that includes an interface and controller. The interface receives a print job that defines documents which each indicate an intended recipient for delivery. The controller is implemented by a processor and memory, and directs devices of a print shop by following a print workflow that comprises an ordered set of activities to perform upon the documents. The controller also detects that the print job has reached a scheduled activity of the workflow for pulling documents from the print job based on criteria, identifies documents of the print job that match the criteria indicated by the activity, and removes the identified documents from the print data of the print job before the print job is printed, preventing the identified documents from printing.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIG. 4 is a block diagram illustrating various tables of data in an exemplary embodiment.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
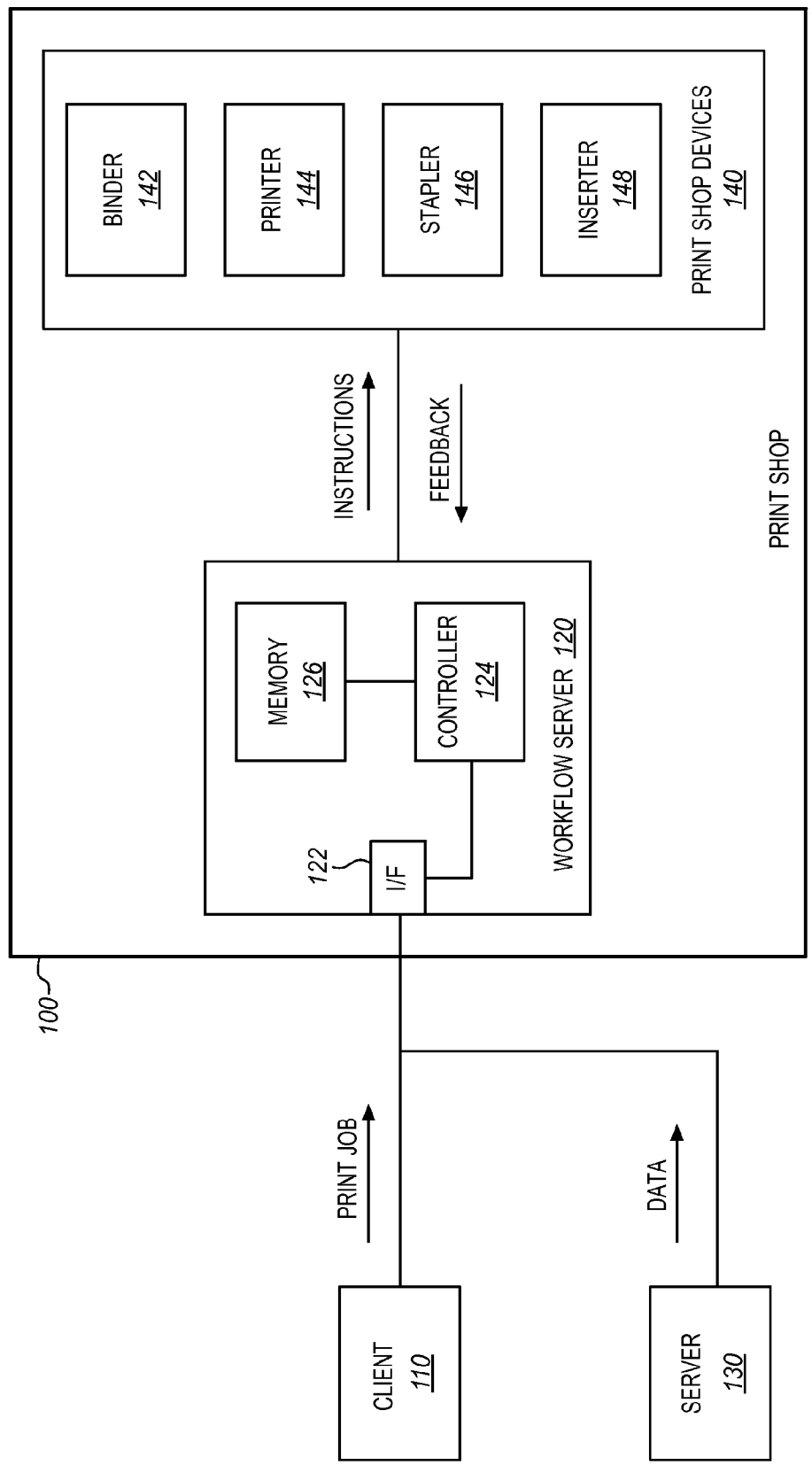
FIG. 1 is a block diagram of a workflow system in an exemplary embodiment.

FIG. 1 is a block diagram of a workflow system 100 in an exemplary embodiment. In workflow system 100, print data for an incoming job is received from client 110 at workflow server 120. Workflow server 120 reviews the incoming print job, and identifies a workflow for the print job. A workflow is an organized set of print shop activities to perform for the print job, such as printing, stapling, or binding. A workflow may be selected from pre-defined templates as desired. After a workflow has been chosen, workflow server 120 directs the devices of the print shop by following the workflow to ensure that the print job is properly handled at the print shop.

Workflow system 100 has been enhanced to utilize workflow activities that dynamically pull documents of a print job from printing, based on specific criteria indicated by those workflow activities. Criteria comprise any suitable metric for selecting one or more documents from a print job, based on print data for the documents and/or other information correlated with the documents. In this embodiment, workflow server 120 includes an interface (I/F) 122 (e.g., an Ethernet interface, wireless interface, etc.) for receiving print data for print jobs from client 110. Workflow server 120 further includes a controller 124 for managing print jobs received at workflow server 120, and a memory 126 (e.g., Random Access Memory (RAM), a hard disk, etc.) for storing print jobs from client 110. Controller 124 may be implemented as custom circuitry, a processor executing programmed instructions, etc.

Server 130 stores data that is relevant to an incoming print job but not part of the print data for that print job. In an embodiment where each print job includes hundreds of thousands of bank statements, server 130 may be an independent banking server that stores data for individual account holders. Server 130 comprises any system or component accessible to workflow server 120, and may for example access a shared file system also available to workflow server 120. In one embodiment, server 130 is external to the print shop. For example, server 130 may be physically separated from the print shop itself, or may be external to a network of the print shop and therefore only accessible via the Internet.

Print shop devices 140 include the devices and components of the print shop that perform the various activities described herein. For example, print shop devices 140 may include printers, post-printing machinery, e-mail or web publishing servers, etc. The print shop devices illustrated in FIG. 1 (binder 142, printer 144, stapler 146, and inserter 148) provide an example of the variety of print shop devices that may be utilized by a print shop. In this embodiment, binder 142 operates to bind printed pages into magazines or books, printer 144 operates to rasterize and print incoming print data onto physical pages, stapler 146 staples groups of pages together, and inserter 148 inserts physical pages into envelopes for delivery to recipients.

The particular arrangement, number, and configuration of components described herein is exemplary and non-limiting. Illustrative details of the operation of workflow system 100 will be discussed with regard to FIG. 2. Assume, for this embodiment, that client 110 has generated a print job for processing by the print shop, and has transmitted print data for the print job to workflow server 120.

Figure 2:
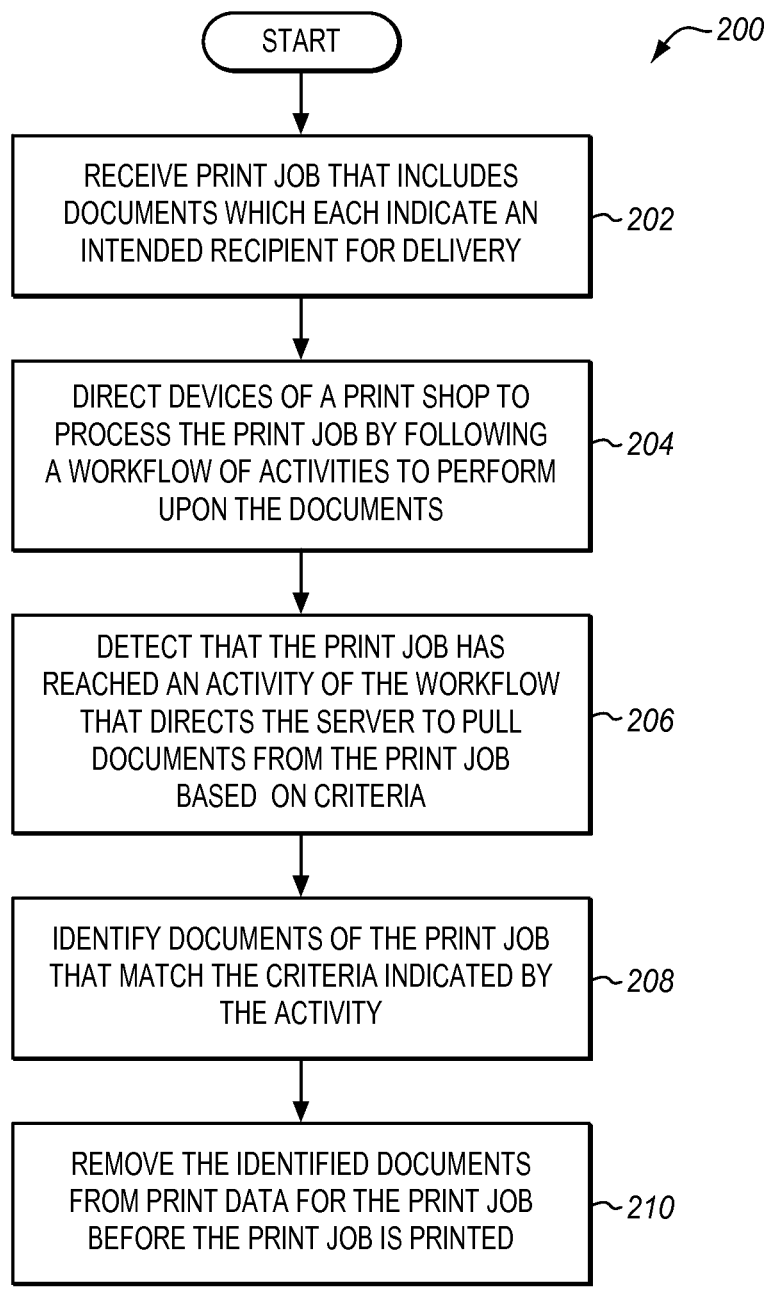
FIG. 2 is a flowchart illustrating a method for operating a workflow system in an exemplary embodiment.

FIG. 2 is a flowchart illustrating a method 200 for operating a workflow system in an exemplary embodiment. The steps of method 200 are described with reference to workflow system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, I/F 122 receives a print job that includes multiple documents from client 110. Each of the documents in the print job indicates an intended recipient for delivery. That is, a job ticket for the print job may identify a recipient for each document, or each document may include print data that identifies a recipient. As used herein, a "document" is an independent portion of a print job that is directed to a specific recipient for delivery (e.g., a single piece of mail). Thus, multiple documents may be defined in a single file of print data. Alternatively, a document may be considered an independent portion of a print job that does not require other portions of the print job in order to maintain its whole context or meaning. For example, an individual chapter of a book is not a document, because the chapter needs to be read along with the other chapters of the book in order to be fully understood. In contrast, in a print job with thousands of bank statements where each bank statement is intended for delivery to a different account holder, each bank statement is a complete document in and of itself.

The print data for the print job received in step 202 may be formatted for example as Page Description Language (PDL) print data, such as an Advanced Function Presentation (AFP) datastream, Portable Document Format (PDF) print data accompanied by JDF job ticket instructions, etc. Controller 124 may further analyze the print job to identify each document, as well as to determine information indicating the recipient of each document (e.g., account number, recipient name, telephone number, etc.). After the print job has been received, controller 124 selects a workflow for the print job. For example, in one embodiment workflow system 100 implements multiple "hot folders" or interfaces that are each associated with a different workflow, and client 110 submits a print job to one of the hot folders at workflow server 120 in order to indicate a desired workflow. In a further embodiment, a combination of print job name and hot folder is used to identify a workflow for the print job. The workflow defines an ordered set of print shop activities that are stored in memory (e.g., in memory 126). For example, the workflow may include configurable activities for directing a printer to print, or directing an inserter to insert documents into an envelope.

When properly assembled and configured, the workflow comprises the digitally defined order of operations to perform at the print shop in order to handle a print job properly. That is, the activities defined in the workflow, when performed in order, enable workflow server 120 to manage the print shop devices and process the print job as desired. Each activity in a workflow may be associated with a category or type of print shop device (e.g., post-processing devices, printers, inserters) and may also be associated with specific named print shop devices. These activities may include printing or non-printing activities (e.g., billing, shipping, document review, multimedia/digital/internet activities, credit checks, etc.) as desired.

In step 204, controller 124 directs print shop devices 140 to process the print job by following the workflow. Directing the individual print shop devices 140 may comprise identifying the current activity that has been reached in the workflow by querying print shop devices 140, sending instructions to the appropriate print shop device based on the current activity, awaiting feedback from the device indicating that processing has successfully completed for the workflow activity, and advancing the print job to the next workflow activity (as internally tracked by controller 124). Advancing the print job to a new activity may comprise transmitting new instructions to the next print shop device that will be handling the print job. Controller 124 may track the current activity on a document-by-document basis or may track the current activity for the entire print job as a whole.

In step 206, controller 124 detects that the print job has reached a workflow activity that directs workflow server 120 to pull documents from the print job. Specifically, the workflow activity has been predefined as a scheduled activity in the selected workflow (i.e., before the workflow was selected in for the print job), and the workflow activity uses a set of logical criteria to indicate which documents should be pulled from the job and suppressed from printing. After controller 124 identifies the criteria, controller 124 may analyze existing print data for the documents, job ticket information for the documents, or other information correlated with the documents in order to determine which documents should be pulled.

The workflow activity detected in step 206 may be specifically and solely directed towards preventing the printing and/or delivery of documents in the print job. That is, in one embodiment the workflow activity includes no other instructions than the instructions indicating which documents should be pulled, and is distinctly defined in the workflow as being separate from other activities such as printing. In one embodiment, the activity includes instructions indicating whether or not pulled documents should be directed along a different workflow that does not include printing, whether the pulled documents should be discarded, and other information indicating how to treat the pulled documents. In one embodiment, in addition to identifying a file storing the criteria, the scheduled workflow activity indicates a basis for determining which documents to pull, such as a ZIP code or account number. This information may indicate a name for each criterion indicated in the file, as well as how to interpret any logical operators in the file (e.g., how to interpret an AND or OR condition that logically links two criteria in the file together).

In print jobs with millions of pages that take days to print, the specific documents that should be suppressed from a job may vary over time. Thus, using one or more specific workflow activities to suppress documents of the print job, while the print job is actively being processed in the workflow, provides a benefit in responsiveness that would not be achieved if documents were suppressed when the print job was initially generated by the customer before transmission to the print shop for printing.

In step 208, controller 124 identifies documents of the print job that match the criteria indicated by the activity. This step may comprise searching for matches between the listed criteria and data that has been previously mined from the print job for each document. For example, for each document (e.g., as represented in the mined data), controller 124 may compare an account number or zip code in the document against the criteria. If there is a match, then the document should be suppressed.

In step 210, controller 124 removes the identified documents from the print data for the print job before the print job is printed, which prevents the identified documents from printing. In one embodiment, controller 124 is responsible for analyzing received print data to generate Page Description Language (PDL) print data for the print job. In this embodiment, to suppress the documents from printing, controller 124 does not generate PDL print data for the identified documents, thereby excising the documents from the print job. In a further embodiment, controller 124 receives the print job as PDL print data, analyzes the PDL print data to identify the documents that match the criteria, and extracts pages of PDL print data for those documents from the print job. This may further comprise changing the page count of the print job and adjusting a Job Definition Format (JDF) job ticket for the print job based on the changed number of pages and documents.

Method 200 provides a benefit over prior systems and techniques, because it allows for a workflow server to dynamically suppress the documents of a print job that is actively being processed in a workflow. Furthermore, method 200 may be performed multiple times in workflows that include multiple activities directed to pulling documents. This means that pulling documents can be performed at any time, and may even be performed multiple times before and after printing. This enhances the flexibility of the workflow in a manner that is both dynamic and beneficial, reducing the chance of wasting ink and paper in printing documents that are no longer needed. Furthermore, this reduces the amount of effort that a customer puts into initially preparing the print job, and increases the responsiveness of printing operations to unpredictable changes.

In a further embodiment, each set of criteria for pulling documents is stored as a different file, sourced by a different entity (e.g., a different server external to the print shop). These suppression files may be located at a specific directory and updated on a regular basis by workflow server 120, or by one or more external servers 130 that contact the print shop via the internet to update the suppression files on a regular basis.

In a further embodiment, the controller receives user input defining a new workflow with pull activities throughout the workflow. Whenever a pull activity is placed in the workflow by a user, the instructions for the activity are dynamically selected based on whether the activity is located before or after a printing activity in the workflow. Specifically, if the pull activity is placed after printing, then when the controller reaches the pull activity, it considers control information with instructions for an inserter to divert the identified documents. Alternatively, if the pull activity is placed before the printing activity, then the workflow is set up with instructions for removing print data for those documents from the print job. Multiple pull activities may be placed before or after printing, and each pull activity may refer to the same or different criteria for pulling documents from the print job. For example, an early pull activity may pull documents based on whether or not an account holder has already paid a past due balance indicated in a document, while a late pull activity may pull documents based on whether or not a disaster such as a fire has made delivery to a specific location untenable.

EXAMPLES

In the following examples, additional processes, systems, and methods are described in the context of a workflow system that prints and sorts account statements for mass-mailing to customers.

In this example, a workflow server operates on a computer of the print shop that is accessible via the Internet. The workflow server accesses print shop devices via an internal print shop intranet, to which a printer, e-mail server, and inserter of the print shop are connected. An incoming print job is received at the workflow server via the Internet as a PDF print job that includes seven hundred thousand documents. Each of the documents corresponds with a credit card statement for a different account holder, and is a mail piece intended for delivery to a different recipient. A controller at the workflow server loads the print job into memory, and determines that the print job is a "statements" type of print job based on the name of the print job and a file folder of the workflow server where the print job was received. The controller then assigns a workflow to the print job based on the type of job.

Figure 3:
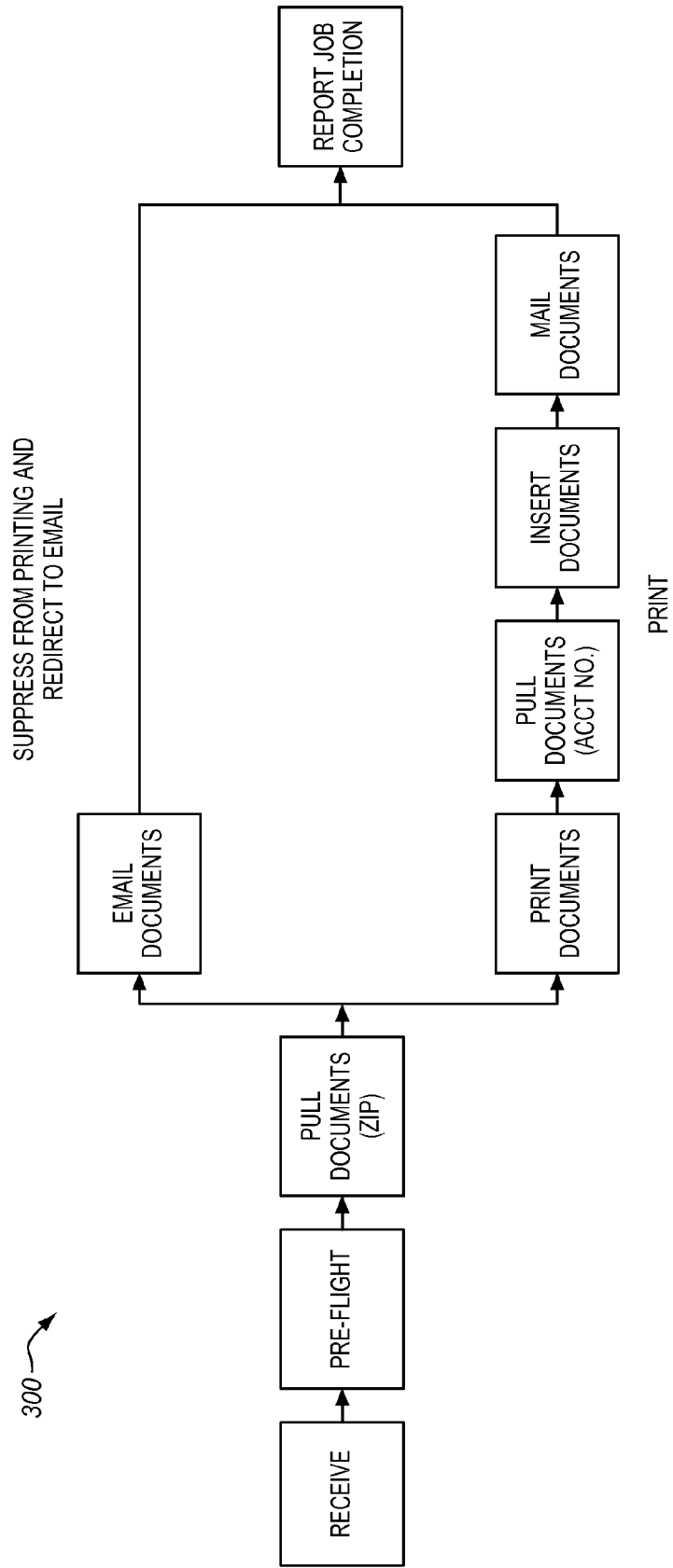
FIG. 3 is a block diagram illustrating a workflow in an exemplary embodiment.

FIG. 3 is a block diagram illustrating the workflow 300 assigned by the workflow server to the print job in this example. The workflow includes multiple configurable activities and two separate branching paths. A controller of the workflow server reviews the workflow, and completes a receive step when the print job has been successfully loaded into memory at the workflow server. During or after the receive step, the controller analyzes the PDF print data for the print job to identify each mail piece within the print job, and to extract an account number from each of the mail pieces. The controller then engages in a pre-flight step, where the controller reviews the print job to ensure that images within the print job are provided at an acceptable resolution, and that colors within the print job are specified correctly. The print shop operator reviews output from the controller during the pre-flight step, and either modifies the print job or notifies the workflow server (via a confirmation dialogue) that the print job is ready for further processing.

After the pre-flight operation has been completed, the controller reviews the next activity defined in the workflow, which is the first "pull documents" activity. This activity is located prior to printing. The first pull documents activity includes multiple instructions for pulling documents from printing. The first instruction indicates a location for a comma separated values suppression file stored in a shared file repository of the workflow server. The file itself may be sourced from an external server (even one that did not originally create the print job), such as a web server for use by the company that manages the accounts.

The second instruction indicates which document field corresponds to the comma separated values from the suppression file (e.g., whether the comma separated values indicate ZIP code, account number, etc.). In this example, the suppression file indicates a list of ZIP codes for suppression. Mail pieces directed to these ZIP codes may need to be suppressed, for example, owing to a natural disaster, the expected length of time taken to perform a mail delivery, and/or other factors.

The controller compares mined ZIP code information for each document against the list of ZIP codes provided in the suppression file. Whenever a document has a ZIP code that matches a ZIP code listed in the suppression file, the controller excises the pages of PDF print data for that document from the print job. In this embodiment, the excised pages are included within a new child job that is routed along a top branch of the workflow (and is never printed). The top branch of the workflow (suppress and email) is chosen because it does not include the printing activity. Along the top branch of the workflow, the excised documents reach an activity for e-mailing, wherein an e-mail server transmits the documents to their recipients digitally instead of printing the documents.

The mail pieces of the original PDF print job are routed along the bottom workflow pathway (print). Along this pathway, the controller transmits the mail pieces to a printer for printing. The next activity along the bottom branch of the workflow is another "pull documents" activity. This activity is intentionally included near the end of the workflow, so that the most up-to-date information can be used to suppress documents from delivery. The second pull documents activity pulls documents based on account number. In this manner, if an account holder has terminated their account after the print job was started but before mailing, the print shop can suppress that recipient's account statement for the terminated account.

In this example, the second pull documents activity includes different instructions than the first pull documents activity. Like the first pull documents activity, the second pull documents activity includes an instruction that points to a file location/directory for its suppression file(s) (and the controller may, for example, suppress documents based on the information from multiple files in the directory). However, unlike the first pull documents activity, the second pull documents activity does not necessarily direct a workflow server to modify print data for a print job, but rather instructs inserters to divert inserted documents intended for suppression to a specific "pull" bin whose contents will be shredded. In one embodiment, this is performed by adding a special barcode to each of the documents that will be suppressed. In a further embodiment, the modification is performed as a change to a non-printing file sent to the inserter indicating which documents (with a given identifier) should be sent to the pull/divert bin. This eliminates the need for manual sorting, yet still achieves the intended result of dynamically suppressing documents from delivery to a recipient.

After the pull documents information has been determined, the workflow server directs the printed documents to one or more inserters. The controller directs the inserters to add inserts to each mail piece. Each inserter includes a set of available inserts for placing into an envelope along with the mail piece. The mail piece is then inserted into an envelope, along with its corresponding inserts. Then, based on the instructions in the pull documents activity (e.g., as marked onto the printed page via a barcode, or as provided via an inserter control file), some documents are dynamically diverted via an inserter to the appropriate output bin (e.g., based on an image analysis performed by a camera of the inserter), ensuring that some of the documents are pulled before incurring the expense of mailing and delivery.

After the remaining mail pieces of the original print job have traveled through their respective workflow paths, the controller sends a completion message to the customer that originally submitted the job, in order to indicate that the job has been successfully completed. Having two activities for suppressing documents in the workflow allows for "just in time" processing of mail pieces to occur, which can help to account for changes that occur as the print job (which may take weeks to process) moves through the workflow.

FIG. 4 is a block diagram 400 illustrating various tables of information in an exemplary embodiment. Table 410 illustrates data mined from the mail pieces of the initially received print job, table 420 includes suppression criteria from a first suppression file, and table 430 includes a second file of suppression criteria. In this embodiment, the first criteria suppresses documents based on ZIP code, while the second criteria suppresses documents based on account number. Further suppression criteria may be used to pull documents based on any logical combination of criteria known to the workflow server that describes the documents of a print job.

Figure 5:
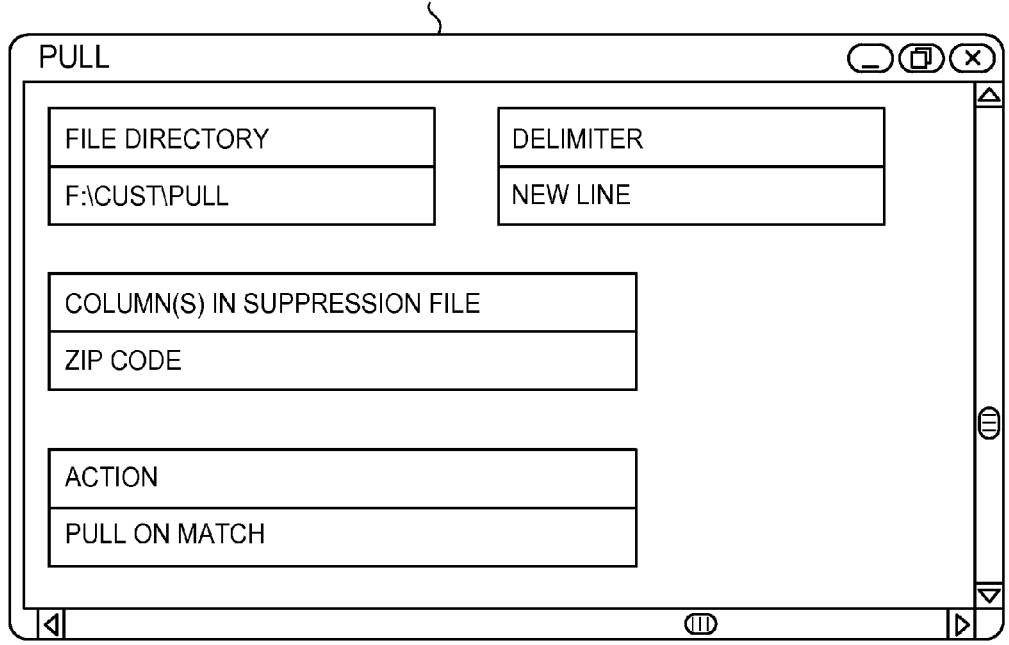
FIG. 5 is a diagram illustrating a workflow activity for suppressing documents of a print job prior to printing in an exemplary embodiment.

FIG. 5 is a diagram 500 illustrating a workflow activity 510 for pulling documents prior to printing in an exemplary embodiment. In this example, the workflow activity 510 is defined in memory at the workflow server to describe a file location for the suppression file, a column (corresponding to a document property) indicated by the suppression file (such as ZIP code or account number), a delimiter used by the suppression file, and an action to perform for suppressed documents. In one embodiment, the action indicates whether or not documents suppressed from a print job should be queued for processing along another workflow or branch of a workflow that does not include printing.

Figure 6:
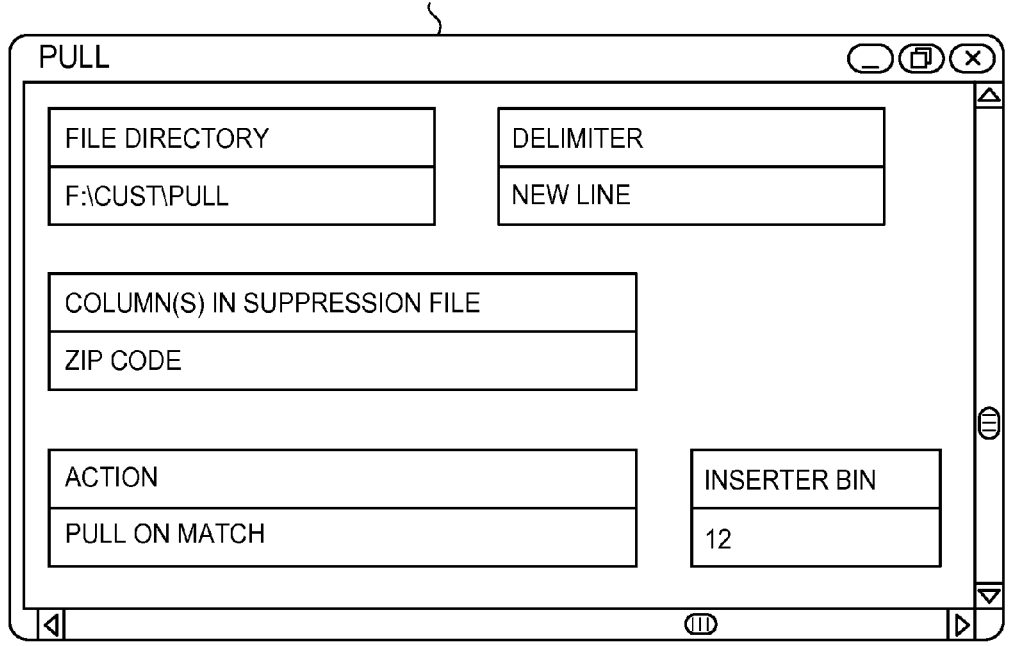
FIG. 6 is a diagram illustrating a workflow activity for suppressing documents of a print job after printing in an exemplary embodiment.

FIG. 6 is a diagram 600 illustrating a workflow activity 610 for pulling documents prior to printing in an exemplary embodiment. The pull activity is placed at a specific ordered location in a workflow when the workflow is first defined and stored in memory on a workflow server. In this example the pull activity includes the location of a suppression file, an indication of what property (or properties) are listed in the suppression file (e.g., account number), and a named inserter output bin for diverting suppressed mail pieces. Thus, the activity of FIG. 6 may be used by a workflow server to direct post-printing machinery (in this case, an inserter) to pull printed documents from the print job.

Figure 7:
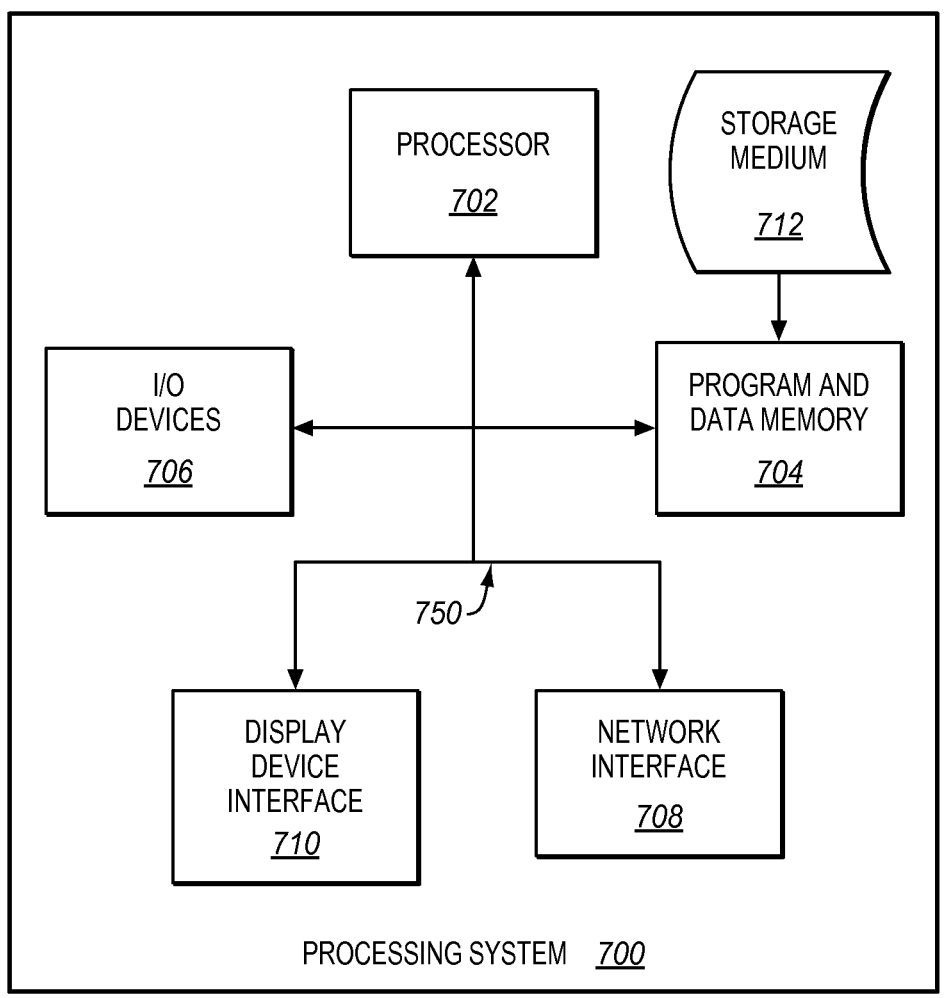
FIG. 7 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of workflow server 120 to perform the various operations disclosed herein. FIG. 7 illustrates a processing system 700 operable to execute a computer readable medium embodying programmed instructions to perform desired functions in an exemplary embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

Although specific embodiments were described herein, the scope of the invention is not limited to those specific embodiments. The scope of the invention is defined by the following claims and any equivalents thereof.

We claim:

1. An apparatus comprising:
a workflow server for a print shop, comprising:
an interface configured to receive a print job that defines documents which each indicate an intended recipient for delivery; and
a controller, implemented by a processor and memory, configured to direct devices of a print shop by following a print workflow that comprises an ordered set of activities to perform upon the documents, wherein the controller is configured to detect that the print job has reached a scheduled activity of the workflow for pulling documents from the print job based on criteria in order to suppress the documents from printing, to identify documents of the print job that match the criteria indicated by the activity, and to remove the identified documents from print data for the print job before the print job is printed, thereby excising the identified documents from the print job to prevent the identified documents from printing at the print shop.

2. The apparatus of claim 1 wherein:
the workflow comprises multiple activities that direct the server to pull documents, each of the multiple activities is associated with different criteria, and
the controller is configured to pull documents from the print job at each of the multiple activities, based on criteria associated with that activity.

3. The apparatus of claim 1 wherein:
the workflow comprises an activity that is located after printing and directs the server to pull documents from the print job based on additional criteria, and
the controller is configured to direct post-printing machinery to pull printed documents from the print job, based on the additional criteria.

4. The apparatus of claim 1 wherein:
the controller is configured to generate Page Description Language (PDL) print data for print jobs, and
the controller is configured to remove the identified documents from the print data by generating PDL print data for the print job that does not include the identified documents.

5. The apparatus of claim 1 wherein:
the print job includes Page Description Language (PDL) print data, and
the controller is configured to remove the identified documents from the print data by identifying PDL print data within the print job that defines the identified documents, and extracting the identified PDL print data from the print job.

6. The apparatus of claim 1 wherein:
the workflow includes multiple branches that each define a separate set of activities, and
the controller is configured to route the removed documents to a different branch of the workflow than the print job, wherein the different branch of the workflow does not include an activity for printing.

7. The apparatus of claim 1 wherein:
the controller is further operable to create a new workflow, to place the activity into the workflow, to determine whether the activity is located in the workflow before or after printing, to configure the activity with instructions for an inserter to divert the identified documents if the activity is placed after printing, and to configure the activity with instructions for removing print data for the identified documents from the print job if the activity is placed before printing.

8. A method comprising:
receiving a print job that defines documents which each indicate an intended recipient for delivery;
directing devices of a print shop by following a print workflow that comprises an ordered set of activities to perform upon the documents;
detecting that the print job has reached a scheduled activity of the workflow for pulling documents from the print job based on criteria in order to suppress the documents from printing;
identifying documents of the print job that match the criteria indicated by the activity; and
removing the identified documents from the print job before the print job is printed, thereby excising the identified documents from the print job to prevent the identified documents from printing at the print shop.

9. The method of claim 8 wherein:
the workflow comprises multiple activities that direct the server to pull documents, each of the multiple activities is associated with different criteria, and
the method further comprises pulling documents from the print job at each of the multiple activities, based on criteria associated with that activity.

10. The method of claim 8 wherein:
the workflow comprises an activity that is located after printing and directs the server to pull documents from the print job based on additional criteria, and
the method further comprises directing post-printing machinery to pull printed documents from the print job, based on the additional criteria.

11. The method of claim 8 further comprising:
removing the identified documents from the print job by generating Page Description Language (PDL) print data for the print job that does not include the identified documents.

12. The method of claim 8 further comprising:
removing the identified documents by identifying Page Description Language (PDL) print data within the print job that defines the identified document, and extracting the identified PDL print data from the print job.

13. The method of claim 8 wherein:
the workflow includes multiple branches that each define a separate set of activities, and
the method further comprises routing the removed documents to a different branch of the workflow than the print job, wherein the different branch of the workflow does not include an activity for printing.

14. The method of claim 8 further comprising:
creating a new workflow;
placing the activity into the workflow;
determining whether the activity is located in the workflow before or after printing;
configuring the activity with instructions for an inserter to divert the identified documents if the activity is placed after printing; and
configuring the activity with instructions for removing print data for the identified documents from the print job if the activity is placed before printing.

15. A non-transitory computer readable medium embodying programmed instructions which, when executed by a processor, are operable for performing a method comprising:
receiving a print job that defines documents which each indicate an intended recipient for delivery;
directing devices of a print shop by following a print workflow that comprises an ordered set of activities to perform upon the documents;
detecting that the print job has reached a scheduled activity of the workflow for pulling documents from the print job based on criteria in order to suppress the documents from printing;
identifying documents of the print job that match the criteria indicated by the activity; and
removing the identified documents from the print job before the print job is printed, thereby excising the identified documents from the print job to prevent the identified documents from printing at the print shop.

16. The medium of claim 15 wherein:
the workflow comprises multiple activities that direct the server to pull documents, each of the multiple activities is associated with different criteria, and
the method further comprises pulling documents from the print job at each of the multiple activities, based on criteria associated with that activity.

17. The medium of claim 15 wherein:
the workflow comprises an activity that is located after printing and directs the server to pull documents from the print job based on additional criteria, and
the method further comprises directing post-printing machinery to pull printed documents from the print job, based on the additional criteria.

18. The medium of claim 15 wherein the method further comprises:
removing the identified documents from the print job by generating Page Description Language (PDL) print data for the print job that does not include the identified documents.

19. The medium of claim 15 wherein the method further comprises:
removing the identified documents by identifying Page Description Language (PDL) print data within the print job that defines the identified document, and extracting the identified PDL print data from the print job.

20. The medium of claim 15 wherein:
the workflow includes multiple branches that each define a separate set of activities, and
the method further comprises routing the removed documents to a different branch of the workflow than the print job, wherein the different branch of the workflow does not include an activity for printing.

* * * * *